United States Patent [19]

Nelimarkka

[11] 4,174,825
[45] Nov. 20, 1979

[54] BALL VALVE WITH RECIPROCAL AND ROTATABLE SPINDLE

[76] Inventor: Juha A. E. Nelimarkka, Marjalahdentie 8, 00930 Helsinki 93, Finland

[21] Appl. No.: 855,334

[22] Filed: Nov. 28, 1977

[30] Foreign Application Priority Data

Dec. 28, 1976 [FI] Finland .................................. 763718

[51] Int. Cl.² .......................... F16K 25/00; F16K 5/06
[52] U.S. Cl. ........................................ 251/86; 251/88; 251/172; 251/315
[58] Field of Search .................... 251/84, 86, 161, 162, 251/163, 315, 172, 316, 317

[56] References Cited

U.S. PATENT DOCUMENTS

| 3,124,333 | 3/1964 | Sivyer | 251/161 |
| 3,195,560 | 7/1965 | Pofit | 251/315 |
| 3,390,861 | 7/1968 | Masheder | 251/161 |
| 3,698,687 | 10/1972 | Kitamura | 251/315 |
| 3,705,707 | 12/1972 | Scaramucci | 251/84 |

FOREIGN PATENT DOCUMENTS

| 444772 | 12/1925 | Fed. Rep. of Germany | 251/163 |
| 509589 | 9/1930 | Fed. Rep. of Germany | 251/163 |
| 511844 | 10/1930 | Fed. Rep. of Germany | 251/163 |
| 1032823 | 6/1966 | United Kingdom . | |

*Primary Examiner*—Martin P. Schwadron
*Assistant Examiner*—G. L. Walton
*Attorney, Agent, or Firm*—Cushman, Darby & Cushman

[57] ABSTRACT

A high pressure environmental ball valve wherein the ball valve member is tiltable into engagement under the influence of pressure into tight sealing relationship with a sealing ring at the valve outlet. The spindle is connected to the ball by a loose fitting wedge member and cooperating V-groove. When operation of the ball is desired, the spindle is moved linearly before rotation in order to bring the wedge on the end of the spindle into tight engagement with the V-groove, low-torque rotation being possible.

6 Claims, 3 Drawing Figures

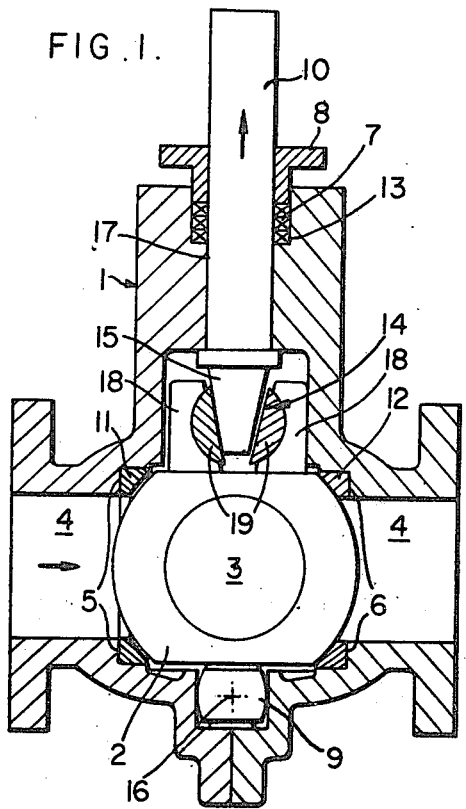
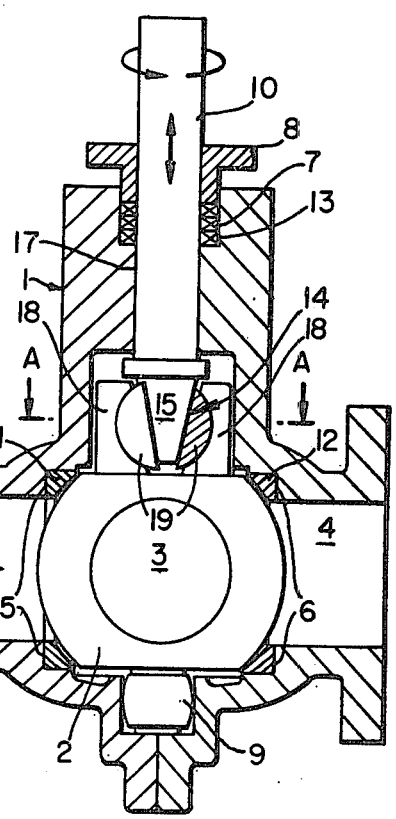
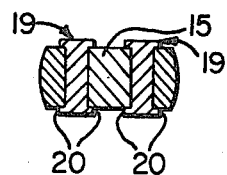
FIG. 1.
FIG. 2.
FIG. 3.

BALL VALVE WITH RECIPROCAL AND ROTATABLE SPINDLE

BACKGROUND AND SUMMARY OF THE INVENTION

The object of this invention is a ball valve comprising a body provided with a flow channel, an essentially ball-shaped or ball-segment shaped closing organ turnably arranged in the valve body, which closing organ is provided with spindles on both sides and which spindles are mounted on both sides of the closing organ perpendicular to the longitudinal axis of the flow passage, and of which spindles one spindle is brought through the wall of the valve to the outside of the valve with the aid of a socket provided with a sealing, such as box sealing, as well as sealing rings fitted into ring-shaped and transversal grooves made in the valve body preferably on both sides of the closing organ.

The purpose of the invention is to accomplish a valve which is simpler than corresponding previous valve constructions and particularly suited for high pipe pressures, for instance 25 MPa or considerably above that, and if needed, suited also for high temperatures, said valve possessing good sealing efficiency but which nevertheless can be regulated at a relatively low torque and therefore by means of a quite small working mechanism.

The main characteristic feature of the valve according to the invention is that a key joint is formed between the closing organ and the regulating spindle, for instance so that the end of the regulating spindle facing the closing organ becomes narrower in a wedge-like fashion towards the closing organ, and that a V-groove opening towards the regulating spindle is formed at the corresponding point in the closing organ, and that the regulating spindle is arranged to be transferred or moved lengthwise in relation to the closing organ, so that the mentioned key joint on one hand can be brought to a completely tight connection and on the other hand to a connection where a sufficiently large clearance exists, so as to permit tipping known as such of the closing organ due to the action of the pressure of the pressure medium, against the sealing ring at the leaving end of the valve in relation to the bearing point of the spindle situated on the opposite side of the closing organ and permitting the mentioned movement, at which the closing organ, by moving the regulating spindle from outside the valve towards the closing organ, is able to be turned from tipped position to a position where the spindles are at right angles to the longitudinal axis of the flow passage of the valve, upon which the closing organ can be turned at a lower torque to desired position.

DETAILED DESCRIPTION OF THE DRAWINGS

The invention is further explained below and in the enclosed drawing, in which

FIG. 1 presents a longitudinal section of a ball valve according to the invention taken at the spindle and the flow passage, in which valve the pipe pressure causes the closing organ to tip against the sealing at the leaving end, FIG. 2 presents the valve in FIG. 1 when the closing organ is inclined or turned from tipped position to position of regulation, and FIG. 3 presents a section taken at A—A in FIG. 2 of the key joint between the regulating spindle and the closing organ.

The valve according to FIGS. 1–3 comprises a valve body 1 and a valve closing organ 2 shaped as a ball segment and provided with a bore or a channel 15 of the same diameter as that of the circular flow passage 4 situated in the valve body 1 on both sides of the closing organ 2. In FIGS. 1 and 2 the valve 1 is in closed position and the mentioned bore or channel 15 is situated crosswise in relation to the flow passage 4.

Joined to the closing organ 2 is an integral spindle 9 extending downwards and a separate longer spindle 10 extending upwards. The spindle 9 is mounted in a corresponding hollow in the valve body, and the spindle 10 in a corresponding bore 17 in the upper part of the valve body.

In the body 1 on both sides of the closing organ 2 ring-shaped grooves 5 and 6 running crosswise in relation to the flow passage 4 are fitted with sealing rings 11 and 12 preferably of metal.

In order to enable the pressure difference prevailing in the pipe system when the valve is closed to push the closing organ 2 against the sealing ring 11 or 12 located on the leaving side, the closing organ 2 is able to turn about the point 16 due to the pressure difference, for instance a little towards the right in FIG. 1.

To this end the circular cross-section of the spindle 9 gets smaller upwards and downwards from center to form a bearing surface of convex shape as shown in the drawing.

A sealing construction for passage of the spindle 10 is joined to the body portion of the valve by means of a so-called box sealing 7. By pressing the encased sealing socket 8 into the body portion 13 of the sealing construction with the aid of bolts, or the like, (not shown in the drawing), the sealing 7 situated around the spindle 10 pushes against the body portion 13.

In accordance with the invention a key joint 14 is formed between the closing organ 2 and the regulating spindle 10, e.g. so that the end 15 of the regulating spindle 10 faces the closing organ 2 becomes narrower in a wedge-like fashion towards the closing organ 2, and that a V-groove opening to the regulating spindle 10 is formed at the corresponding point in the closing organ 2. In the working example presented in the figures this v-groove of the closing organ 2 is formed with the aid of bearing blocks 19 fitted between the supports 18 extending upwards from the closing organ 2. The surfaces of the bearing blocks 19 facing each other constitute planes forming the mentioned V-groove. The surfaces of the bearing blocks 19 directed towards the supports 18 of the closing organ 2 and resting against them are parts of cylinder surfaces in the way shown in the figures, so that when the closing organ 2 is tipping against the sealing on the leaving side, that bearing block 19 which will rest against the wedge-like end 15 of the regulating spindle 10 is turning analogue to the tipping in such way, that the plane of the bearing block 19 over its entire area corresponds with the corresponding plane of the wedge-shaped end 15. In accordance with FIGS. 3 the ends of the bearing blocks 19 are provided with edge projection 20 in such way that they prevent mutual movement between the spindle 10 and the closing organ 2 in the longitudinal direction of the bore or channel 3.

Thanks to the construction described above the closing organ 2 and the spindle 9 are able to incline or tip by the action of the pressure difference prevailing in the pipe system, at which the closing organ 2 is pushing against the sealing 12 in accordance with FIG. 1.

In opening the valve the closing organ is turned 90° about its vertical axis or the spindles 9 and 10, at which the bore 3 will have the same direction as the flow passage 4. However, if the closing organ 2 is pressing very hard against the sealing ring 12 when the pipe pressure acting on the valve is particularly high, the closing organ 2 can be turned from outside the valve by means of the spindle 10 by pressing this downwards from tipped position or position of pushing against the sealing ring 12, towards a position where the closing organ 2 is free from the sealing 12 or is pushing it by decreased pressure, upon which the closing organ 2 can be turned at a lower torque to desired position.

The actual turning of the closing organ 2 to opened or closed position takes place in quite conventional manner by means of a mechanism (not shown in the drawing). The lengthwise movement of of the regulating spindle 10 is also performed by a mechanism suited for the purpose, for instance a cylinder-piston device. Then of course the devices accomplishing the axial movement have to be fastened to the spindle 10 with such bearing arrangement that fastening does not prevent required turning of the spindle 10 in order to regulate the valve.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

I claim:

1. A ball valve comprising
   a body provided with a flow channel;
   a generally ball-shaped rigid closing organ;
   sealing rings fitted into ring-shaped and transverse grooves in the valve body on both sides of said closing organ;
   a pair of spindles associated with said closing organ and provided extending from opposite sides thereof for receipt by said body; and mounting said organ so that the pressure of fluid on said organ tips said organ into sealing engagement against a said sealing ring; and
   means for actuating said organ to rotate it with respect to said body to effect opening and closing of said flow channel, said means including one of said spindles extending through said body to the exterior of the valve through a sealing mechanism, said one spindle having a wedgelike first end thereof; means defining a generally V-shaped groove in one side of said organ for cooperation with said one spindle first end; and means for mounting said one spindle with respect to said V-shaped groove so that normally said one spindle first end is spaced from operative engagement with said means defining said organ V-shaped groove, and so that low-torque turning of said organ is effected by linear reciprocation of said one spindle into operative association with said means defining said V-shaped groove to move said organ out of tipping engagement with a said sealing ring, and subsequent rotation of said spindle and organ.

2. Valve according to patent claim 1, characterized in that the surfaces of the bearing blocks facing each other are planes.

3. A valve according to claim 2 characterized in that the ends of the bearing blocks are provided with end projections.

4. A valve as recited in claim 1, wherein said means defining said V-shaped groove in said organ comprises a plurality of bearing blocks fitted between supporting parts projecting from said organ in the direction of said one spindle.

5. A valve according to claim 4 characterized in that the surfaces of the most mutually corresponding supporting parts of the bearing blocks in the closing organ are parts of a circular-cylindrical surface, the axis of which is situated at the axis of the regulating spindle perpendicular to the axis of this spindle.

6. A valve according to claim 4 characterized in that the ends of the bearing blocks are provided with end projections.

* * * * *